United States Patent
Mishra et al.

(10) Patent No.: US 12,346,246 B2
(45) Date of Patent: Jul. 1, 2025

(54) SYSTEM AND METHOD FOR DYNAMIC DEBUGGING OF DATA IN A TRIAGE ENVIRONMENT INTEGRATION WITH USE OF A VIRTUAL ASSISTANT GRAPHICAL USER INTERFACE

(71) Applicant: BANK OF AMERICA CORPORATION, Charlotte, NC (US)

(72) Inventors: Amit Mishra, Chennai (IN); Anushka Pandey, Tamil Nadu (IN); Suvendu Ranjan Pani, Odisha (IN); Krithika Viswanathan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 173 days.

(21) Appl. No.: 17/942,600

(22) Filed: Sep. 12, 2022

(65) Prior Publication Data
US 2024/0086308 A1 Mar. 14, 2024

(51) Int. Cl.
G06F 11/3698 (2025.01)
G06F 9/451 (2018.01)

(52) U.S. Cl.
CPC .......... *G06F 11/3698* (2025.01); *G06F 9/453* (2018.02)

(58) Field of Classification Search
None
See application file for complete search history.

(56) References Cited

U.S. PATENT DOCUMENTS

| | | |
|---|---|---|
| 6,178,503 B1 * | 1/2001 | Madden ................. G06F 9/441 713/100 |
| 7,669,186 B2 | 2/2010 | Nolan et al. |
| 8,479,154 B1 | 7/2013 | Friedman |
| 8,656,361 B2 | 2/2014 | Bragdon et al. |
| 9,021,443 B1 | 4/2015 | Lachwani et al. |
| 9,081,601 B2 | 7/2015 | Tang |
| 9,117,018 B2 | 8/2015 | Tepus |
| 9,185,039 B1 | 11/2015 | Lachwani et al. |
| 9,201,759 B2 * | 12/2015 | Wintergerst .......... G06F 11/362 |
| 9,336,023 B2 | 5/2016 | Mukkamala et al. |
| 9,632,915 B2 | 4/2017 | Davis et al. |
| 9,684,584 B2 | 6/2017 | Bates et al. |
| 9,703,681 B2 * | 7/2017 | Taylor ................. G06F 11/3466 |
| 9,823,995 B2 | 11/2017 | Menahem et al. |
| 10,049,029 B1 * | 8/2018 | Vu ....................... G06F 11/3698 |

(Continued)

FOREIGN PATENT DOCUMENTS

CN 109634852 B * 3/2022 .......... G06F 11/3664

OTHER PUBLICATIONS

McDowell, "Debugging Concurrent Programs", 1989, ACM (Year: 1989).*

*Primary Examiner* — Hossain M Morshed
(74) *Attorney, Agent, or Firm* — Moore & Van Allen PLLC; Nicholas C. Russell

(57) ABSTRACT

Systems, computer program products, and methods are described herein for developers to initiate development operations from within a development environment of a user application. This can also be extendable dynamically for different user groups (e.g., testers, support, internal associates or employees, or the like), and environments (e.g., lower-level environments, production environments, or the like). As such, the invention offers a dynamic debug mode feature for virtual assistants based on different sections of users and environments.

20 Claims, 6 Drawing Sheets

(56) References Cited

U.S. PATENT DOCUMENTS

| | | | |
|---|---|---|---|
| 10,261,889 B2 | 4/2019 | Asthana et al. | |
| 10,445,222 B2 | 10/2019 | Mankovskii | |
| 10,446,147 B1* | 10/2019 | Moniz | G06F 3/167 |
| 10,621,068 B2 | 4/2020 | Kruszewski et al. | |
| 10,628,135 B2 | 4/2020 | Sharma et al. | |
| 10,684,938 B2 | 6/2020 | Ekambaram et al. | |
| 10,838,788 B2 | 11/2020 | Caldato et al. | |
| 11,048,615 B2* | 6/2021 | Raviv | G06F 8/33 |
| 2007/0043547 A1* | 2/2007 | Plun | H04L 41/22 |
| | | | 703/13 |
| 2010/0017788 A1* | 1/2010 | Bronkhorst | G06F 11/3698 |
| | | | 717/125 |
| 2011/0191752 A1 | 8/2011 | Cleraux et al. | |
| 2013/0283237 A1* | 10/2013 | Hartadinata | G06F 11/3698 |
| | | | 717/124 |
| 2013/0298092 A1* | 11/2013 | Ting | G16Z 99/00 |
| | | | 716/102 |
| 2017/0075789 A1 | 3/2017 | Skinner | |
| 2019/0163355 A1* | 5/2019 | Govindaraju | G06F 8/71 |
| 2020/0142376 A1* | 5/2020 | Sawahara | G06F 8/451 |
| 2023/0237276 A1* | 7/2023 | Lima | G06F 16/35 |
| | | | 704/9 |
| 2024/0078004 A1* | 3/2024 | Qian | G06F 3/0482 |

\* cited by examiner

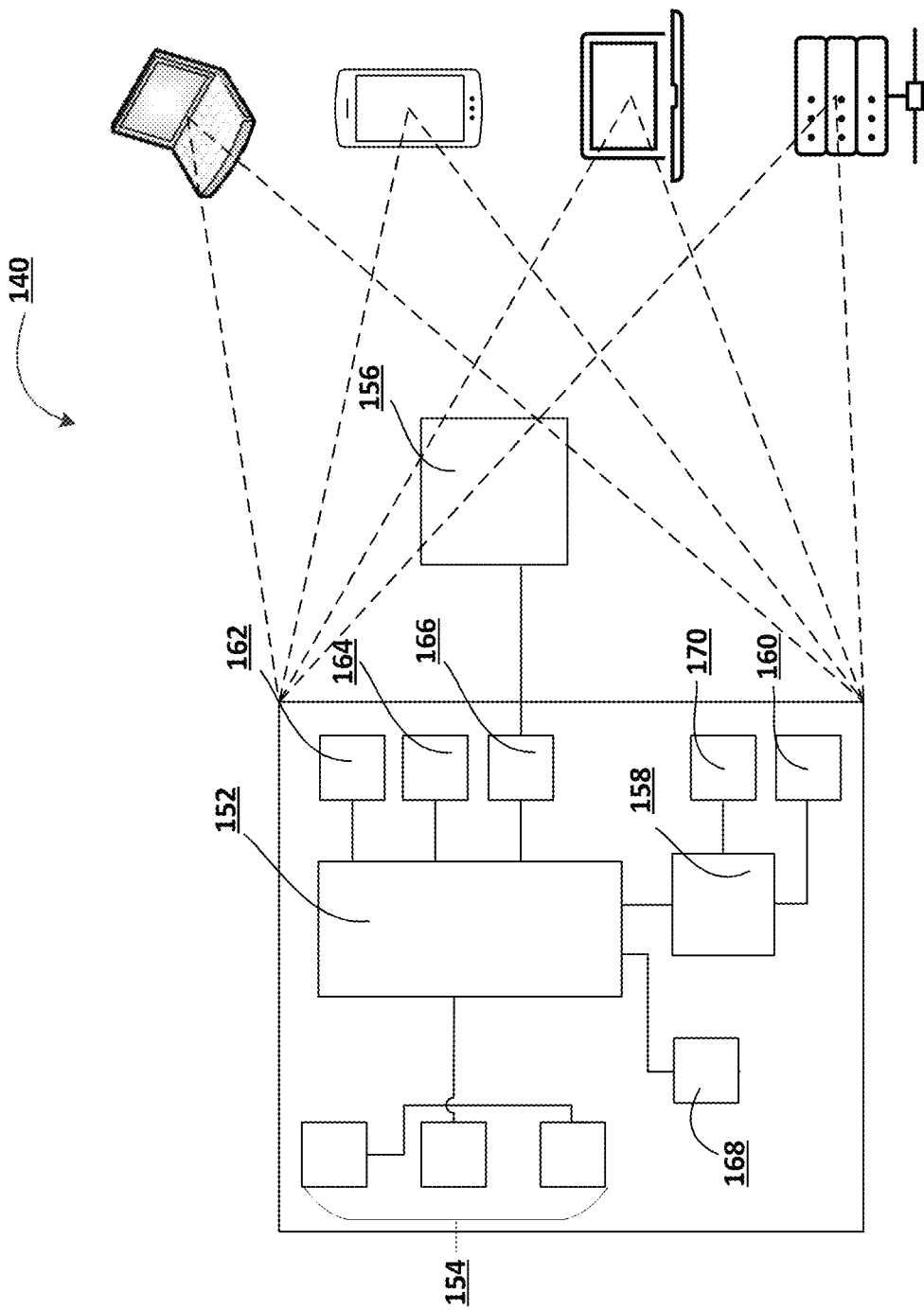

SYSTEM AND METHOD FOR DYNAMIC DEBUGGING OF DATA IN A TRIAGE ENVIRONMENT INTEGRATION WITH USE OF A VIRTUAL ASSISTANT GRAPHICAL USER INTERFACE

FIELD OF THE INVENTION

The present invention embraces a system for dynamic debugging of data in a triage environment via integration with use of a virtual assistant graphical user interface.

BACKGROUND

There is a need for a system which enhances and streamlines the process for debugging user applications within a development environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

The present invention provides a capability for developers to initiate development operations from within a development environment of a user application. This can also be extendable dynamically for different user groups (e.g., testers, support, internal associates or employees, or the like), and environments (e.g., lower-level environments, production environments, or the like). As such, the invention offers a dynamic debug mode feature for virtual assistants based on different sections of users and environments.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive a user request via an application on a user device; analyze the user request to determine a user configuration associated with a user; based on the user configuration, determine that the user is an application developer; automatically enable an option to toggle a debug mode on or off via an application user interface of the application; receive a user selection via the application user interface to toggle the debug mode on; receive an additional user request via the application interface; and generate a response to the additional user request, wherein the response includes one or more additional developer debug details.

In some embodiments, the at least one processor is further configured to: receive a modification request via the application interface; and initiate a data modification to a component or process of the application in response to the modification request.

In some embodiments, the at least one processor is further configured to confirm the data modification to the component or process of the application via the application interface.

In some embodiments, generating a response to the additional user request further comprises providing one or more application system process details within the application interface without the use of a separate application.

In some embodiments, the application interface comprises a virtual assistant chat window interface.

In some embodiments, the user configuration further comprises one or more authentication credentials used to verify the identity of the user such as a username and password combination.

In some embodiments, generating a response to the additional user request further comprises listing one or more session data items below a virtual assistant chat window interface within the application interface.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
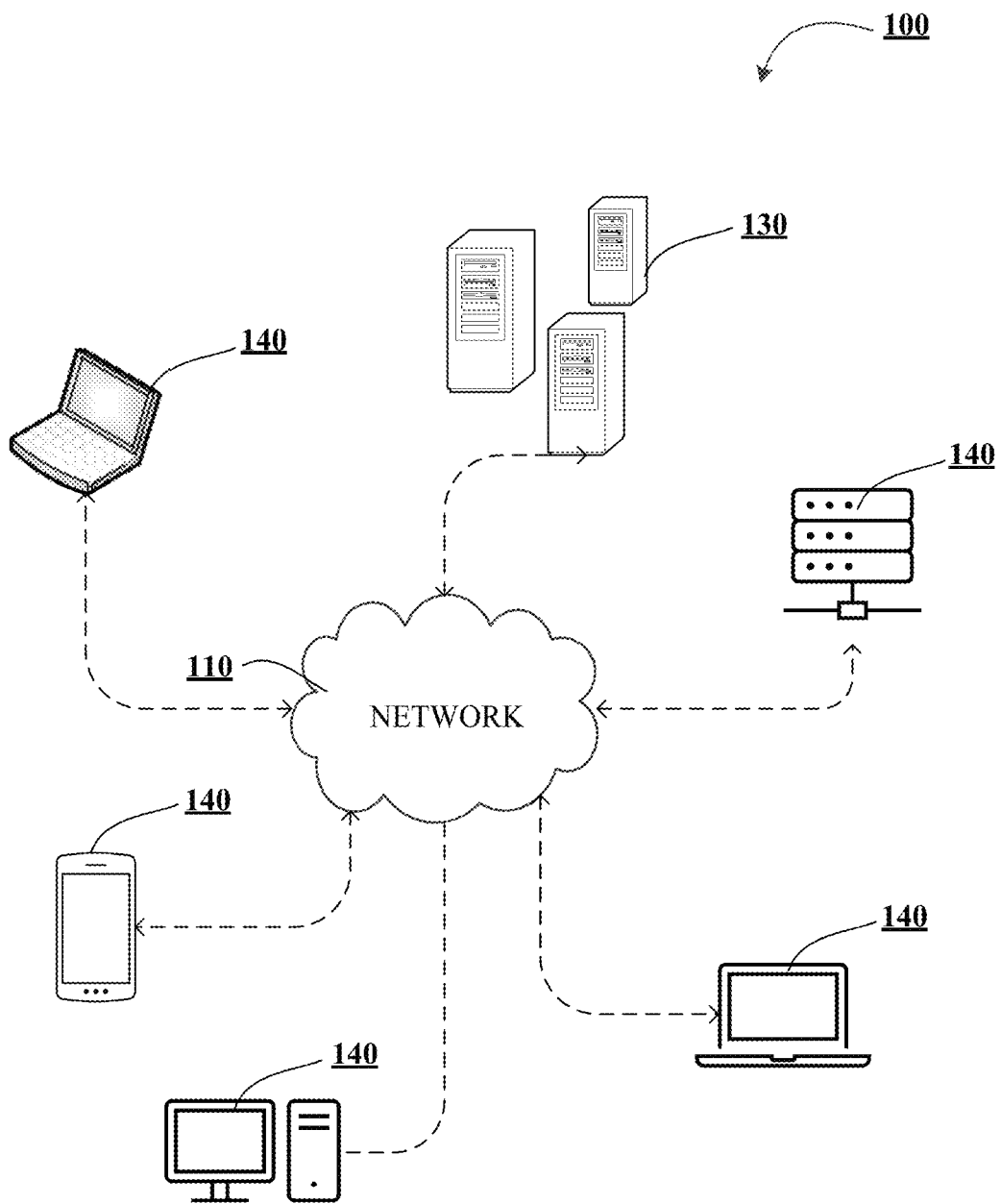
Figure 1B:
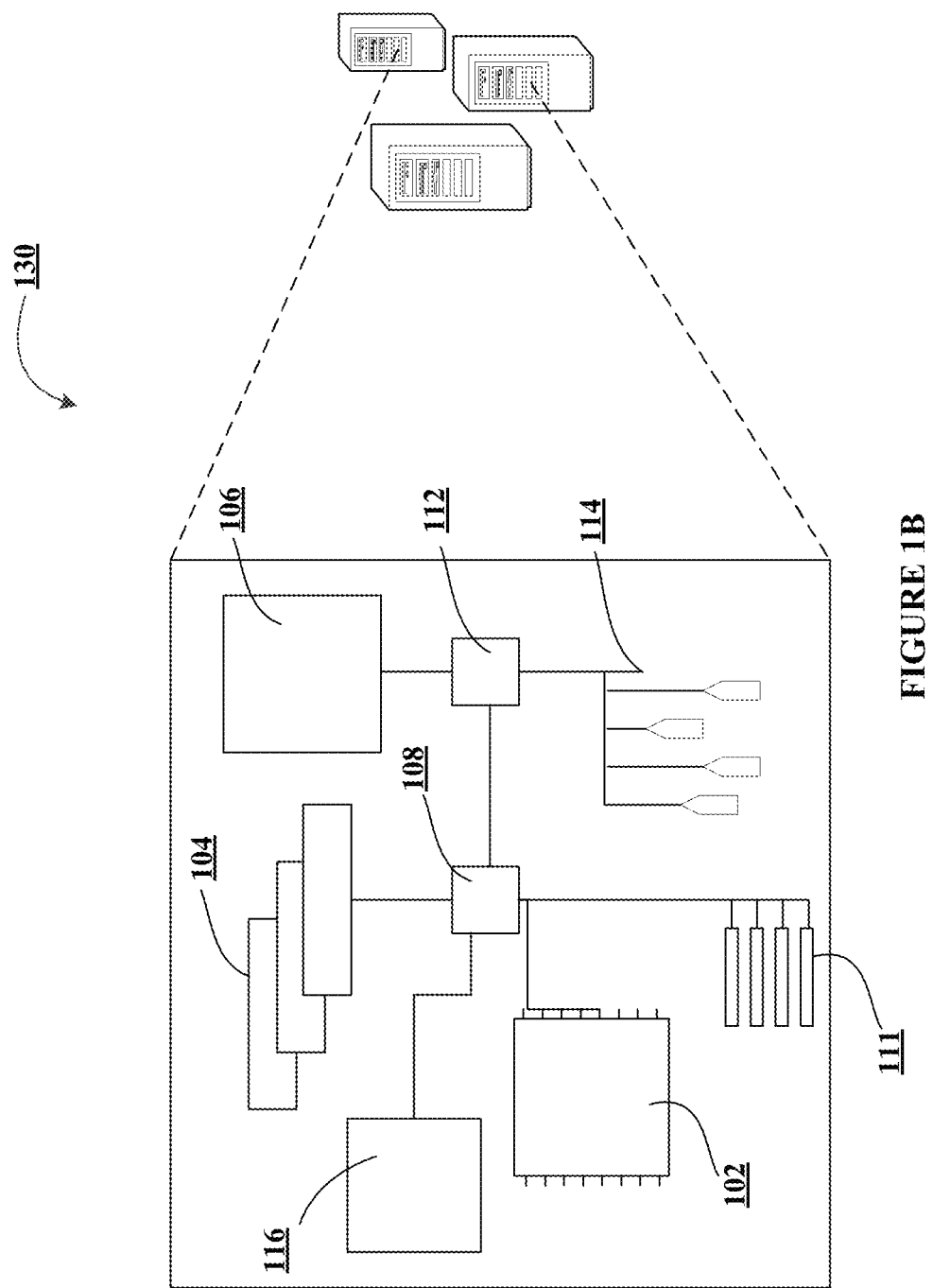
Figure 2:
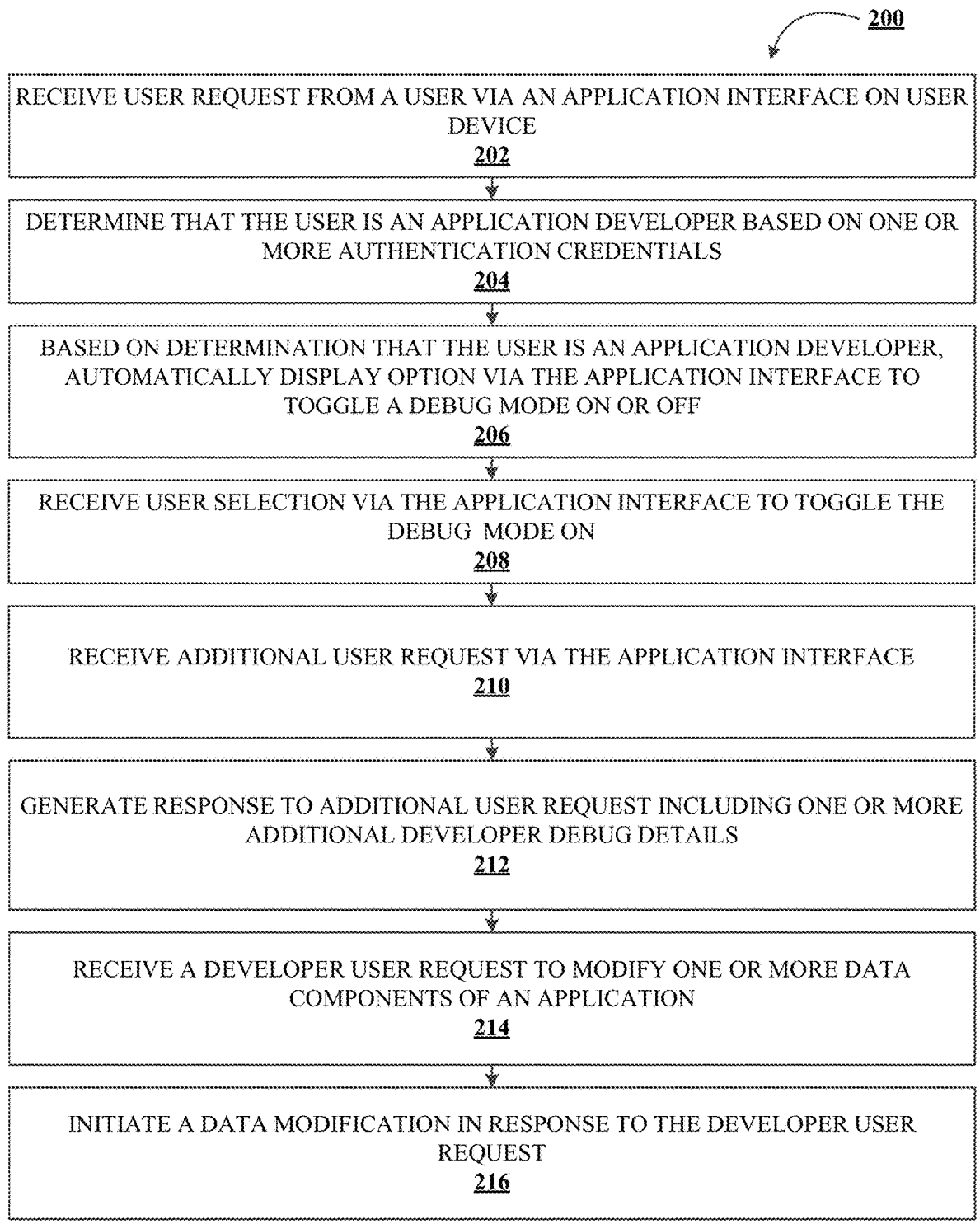
Figure 3:
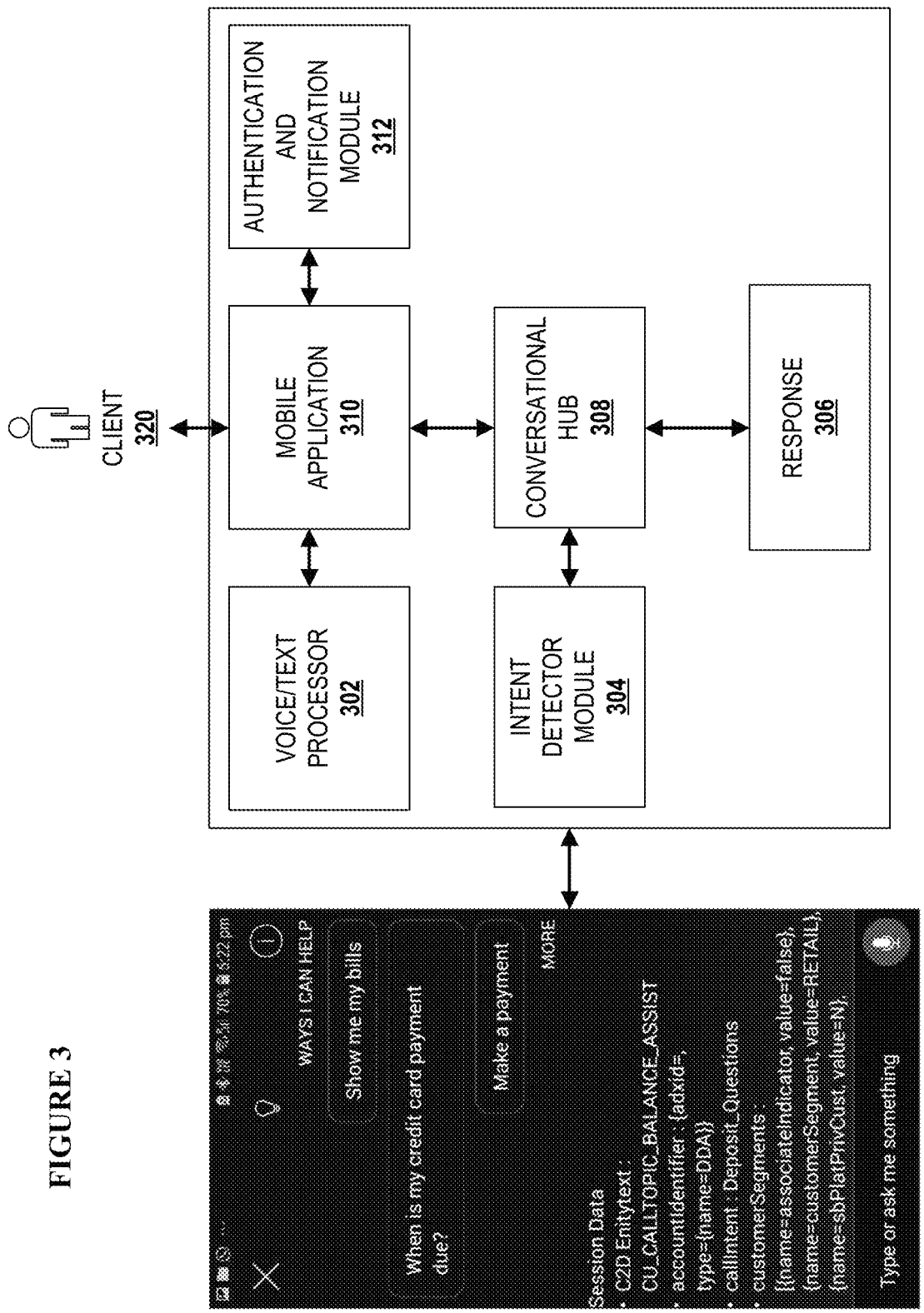
Figure 4:
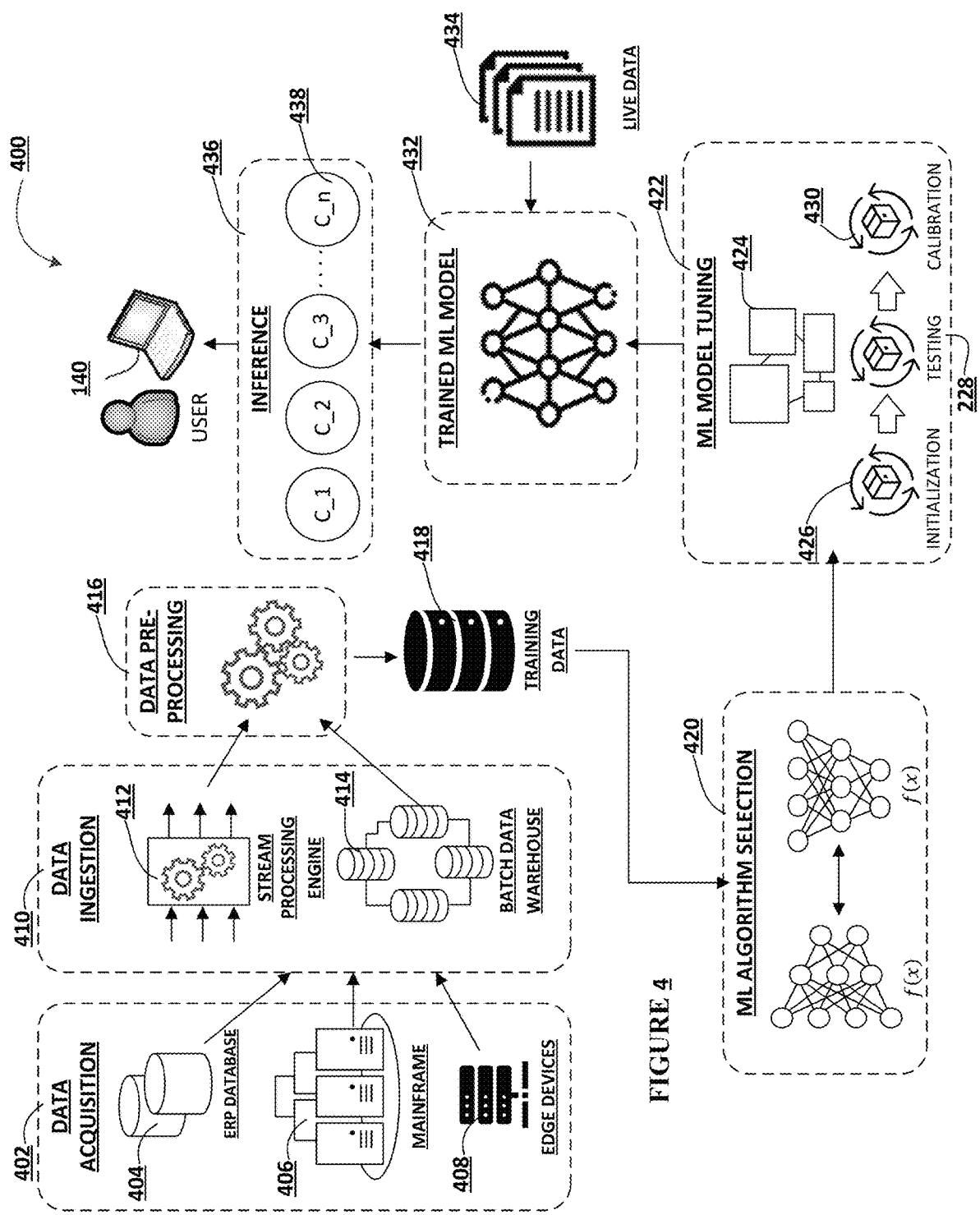

Having thus described embodiments of the invention in general terms, reference will now be made the accompanying drawings, wherein:

FIGS. 1A-1C illustrates technical components of an exemplary distributed computing environment for dynamic debugging of data in a triage environment, in accordance with an embodiment of the invention;

FIG. 2 illustrates a process flow for dynamic debugging of data in a triage environment, in accordance with an embodiment of the invention;

FIG. 3 illustrates an additional process flow for dynamic debugging of data in a triage environment, in accordance with an embodiment of the invention; and FIG. 4 illustrates an exemplary machine learning (ML) subsystem architecture 400, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

The present invention provides a capability for developers to initiate development operations from within a development environment of a user application. This can also be extendable dynamically for different user groups (e.g., testers, support, internal associates or employees, or the like), and environments (e.g., lower-level environments, production environments, or the like). As such, the invention offers a dynamic debug mode feature for virtual assistants based on different sections of users and environments.

An application developer is typically dependent on various system logs to validate functionalities of a given application, such as a chat bot, virtual assistant, resource management application, or the like. For instance, an application as contemplated by the present invention may include a resource management application such as a banking application, which may include various functionalities for virtual assistance, or the like. Typically, developers need to reference various system logs in order to debug issues that arise during the development and testing of the application prior to deployment in a client scenario. Manually reviewing system logs in a separate developer module can be a time-consuming procedure. Additionally, this process may be dependent on performance and availability of an external logging system or third-party program.

The present invention allows a specified user group (e.g., developer, tester, internal associates, support engineers, or the like) to toggle a "debug mode" dynamically while using the application that they are developing. Once the debug mode is activated, specified user groups can authenticate themselves and visualize all the necessary debug data on the application user interface (UI) screen alongside normal data that the client would see when using the application in a deployed state. It is understood that only the specified user group has access to use the debug mode via authentication, which may be achieved using several different authentication techniques such as a username and password combination, a multifactor authentication mechanism, a biometric authentication mechanism, hardware key authentication, or the like. Non-user group users will not be presented an option to activate or toggle on/off the debug mode and will only be shown the client view of the application. The debug mode also provides a way to facilitate dynamic flow changes. For example, in some embodiments, a developer may view or update a property value used in the application to determine a flow during validation. Additionally, in some embodiments, the developer can use commands from the application to obtain any user specific data (e.g., retrieve customer type, resource account information, device information, or the like).

Accordingly, the present invention provides a debug mode features in a virtual assistance environment of an application. Developers can locate issues quickly using the debug mode of the invention. The mode will developers to visually see the flow diagram of the components in execution flow, initiate environment changes for the application, identify malfunctioning components and rectify them, as well as recreate client sessions to help developers replicate issues in lower environment scenarios.

What is more, the present invention provides a technical solution to a technical problem. As described herein, the technical problem includes the typical approach to application development which requires a separate program to collect and access system logs for manual review. The technical solution presented herein allows for a more convenient user interface which provides developers access to system logs and on-the-fly change implementation from within an application UI without the use of a separate system log program. In particular, dynamic debug feature is an improvement over existing solutions to the diagnosis associated with application development (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for dynamic debugging of data in a triage environment 100, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for dynamic debugging of data in a triage environment, in accordance with an embodiment of the invention. As shown in block 202, the process begins whereby the system receives a user request from a user via an application interface on a user device. Once the system begins interacting with the application, the system may reference a database of user configurations to determine the user's access rights. For instance, a user may be a client, in which case the user may only have access rights to the deployed configuration of the application and will not have access to developer capabilities. However, in instances where the user is a developer, the system may automatically determine that the user has increased access privileges via the user's credentials stored in the user configuration database. The system may require the user to login to the application via a portal, home login screen, or the like, by providing a username and password combination. In other embodiments, the system may require the user to enter a multifactor authentication code, answer one or more prepopulated personal questions, or the like, if the system does not recognize that the device identification number, IP address, or the like, does not match a known data point stored in the user's user configuration. Once the user has logged into the application, the user may begin interacting with the system via the application. In some embodiments, the application may comprise a text-based virtual assistant, or the like, wherein the user can input text-based requests to the system via the application user interface (UI). After receiving a user request, the system may determine that the user is an application developer based on one or more authentication credentials stored in the user configuration database, as indicated in block 204.

Based on the determination that the user is an application developer, the system may automatically display an option via the application UI to toggle a "debug mode" on or off, as shown in block 206. The debug mode allows the user to access additional information from within the application UI itself. For instance, when a client user or user without developer access rights interacts with the application, they may only receive responses in the form of a virtual assistant. An example may be the user inputting a request to check their resource spend limit on one or more resource accounts in the form of a natural language question, such as "what is my spending limit on Account X?" or "show me my current outstanding bills." The system may respond with the requested information intelligently in order to provide this information to the client user. In instances where the user has developer access rights, the system will provide an option to toggle debug mode "on." For instance, the user may simply enter, in the virtual assistant chat window, a request to "turn on debug mode." In this way, the system receives a user selection via the application UI to toggle the debug mode on, as shown in block 208.

Once the debug mode has been toggled on, the system may receive additional user requests via the application UI, as shown in block 210. The system may then generate a response to the additional user request, after the debug mode has been turned on, which includes one or more additional developer debug details, as indicated in block 212. For instance, the system may provide additional debug details within the chat window of the application UI, such as below the chat window (as shown in FIG. 3). The debug data may be a truncated report of system processes executed during a given user request. For instance, with developer or debug mode on, the system may receive a request to "check my resource balance of Account X." The system will execute the programmed processes associated with checking the resource balance of Account X and will indicate the success or failure of any modules, processes, or system components of the application below the chat interface in a "session data" window.

In some embodiments, the system may further receive a developer user request to modify one or more data components of the application, as shown in block 214. For instance, the developer user may input a command into the virtual assistant chat window itself, which allows the developer user to treat the virtual assistant window as a command line interface. An exemplary debug command may include a property value change or database content check within the debug mode. For instance, the developer user may enter "debug config ich.dispute.flow.version" in order to request a version lookup of a particular process. The system may respond with something such as "ich.dispute.flow.version=98.26," indicating that the version is 98.26. The developer may respond with "debug config ich.disput.flow.version 17.32" to change the property value from 98.26 to 17.32. The system may confirm this command be responding "ich.dispute.flow.version set to 17.32." In other words, the system may initiate a data modification in response to the developer user request, as indicated in block 216.

FIG. 3 illustrates an additional process flow for dynamic debugging of data in a triage environment, in accordance with an embodiment of the invention. As shown in FIG. 3, the application UI may include a virtual assistant chat window with debug mode toggled on, as shown by the exemplary graphical user interface 300. Further illustrated in FIG. 3 to the right of the exemplary graphical user interface 300 are various process steps, modules, or the like which may be manipulated by the developer user while utilizing the debug mode of the application UI. For instance, while the client 320 interacts with the mobile application 310, the mobile application 310 may utilize various backend components such as a conversational hub 308, which stores a natural language processing engine for communicating with the user via natural language text via the application UI. The mobile application 310 may further reference a voice/text processor 302, allowing the client to input voice commands which are translated into text by the system. Other components may include an authentication and notification module 312, an intent detector module 304, or the like. These and other system components may be configured by the developer user in the course of utilizing the debug mode of the mobile application 310. It is understood that multiple components may be utilized to generate a response 306 to any of the user requests received from a client user or developer user via the mobile application.

FIG. 4 illustrates an exemplary machine learning (ML) subsystem architecture 400, in accordance with an embodiment of the invention. The system may employ the ML subsystem architecture 400 in the course of analyzing natural language, such as user requests received via the virtual assistant in the form of text or voice requests. The machine learning subsystem 400 may include a data acquisition engine 402, data ingestion engine 410, data pre-processing engine 416, ML model tuning engine 422, and inference engine 436.

The data acquisition engine 402 may identify various internal and/or external data sources to generate, test, and/or integrate new features for training the machine learning model 424. These internal and/or external data sources 404, 406, and 408 may be initial locations where the data originates or where physical information is first digitized. The data acquisition engine 402 may identify the location of the data and describe connection characteristics for access and retrieval of data. In some embodiments, data is transported from each data source 404, 406, or 408 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 404, 406, and 408 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 402 from these data sources 404, 406, and 408 may then be transported to the data ingestion engine 410 for further processing.

Depending on the nature of the data imported from the data acquisition engine 402, the data ingestion engine 410 may move the data to a destination for storage or further analysis. Typically, the data imported from the data acquisition engine 402 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 402, the data may be ingested in real-time, using the stream processing engine 412, in batches using the batch data warehouse 414, or a combination of both. The stream processing engine 412 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 414 collects and transfers data in batches according to scheduled intervals, trigger events, or any other logical ordering.

In machine learning, the quality of data and the useful information that can be derived therefrom directly affects the ability of the machine learning model 424 to learn. The data pre-processing engine 416 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 416 may implement feature extraction and/or selection techniques to generate training data 418. Feature extraction and/or selection is a process of dimensionality reduction by which an initial set of data is reduced to more manageable groups for processing. A characteristic of these large data sets is many variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 418 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 422 may be used to train a machine learning model 424 using the training data 418 to make predictions or decisions without explicitly being programmed to do so. The machine learning model 424 represents what was learned by the selected machine learning algorithm 420 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 422 may repeatedly execute cycles of experimentation 426, testing 428, and tuning 430 to optimize the performance of the machine learning algorithm 420 and refine the results in preparation for deployment of those results for consumption or decision making. To this end, the ML model tuning engine 422 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 418. A fully trained machine learning model 432 is one whose hyperparameters are tuned and model accuracy maximized.

The trained machine learning model 432, similar to any other software application output, can be persisted to storage, file, memory, or application, or looped back into the processing component to be reprocessed. More often, the trained machine learning model 432 is deployed into an existing production environment to make practical business decisions based on live data 434. To this end, the machine learning subsystem 400 uses the inference engine 436 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 438) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 438) live data 434 based on how similar they are to one another to solve exploratory challenges where little is known about the data, provide a description or label (e.g., C_1, C_2 . . . C_n 438) to live data 434, such as in classification, and/or the like. These categorized outputs, groups (clusters), or labels are then presented to the user input system 130. In still other cases, machine learning models that perform regression techniques may use live data 434 to predict or forecast continuous outcomes.

It will be understood that the embodiment of the machine learning subsystem 400 illustrated in FIG. 4 is exemplary and that other embodiments may vary. As another example, in some embodiments, the machine learning subsystem 400 may include more, fewer, or different components.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for dynamic debugging of data in a triage environment, the system comprising:
    at least one non-transitory storage device; and
    at least one processor coupled to the at least one non-transitory storage device, wherein the at least one processor is configured to:
    receive a user request via an application on a user device;
    analyze the user request to determine a user configuration associated with a user;
    based on the user configuration, determine that the user is an application developer;
    automatically enable an option to toggle a debug mode on or off via an application user interface of the application;
    receive a user selection via the application user interface to toggle the debug mode on;
    receive an additional user request via the application interface; and
    generate a response to the additional user request, wherein the response includes one or more additional developer debug details, further comprising:
        dynamically generating a visual representation of system processes in real-time within the application user interface when the debug mode is enabled; and
        receiving a modification request via the application interface and updating a property value used in the application in response to the modification request.

2. The system of claim 1, wherein the at least one processor is further configured to:
    receive a modification request via the application interface; and
    initiate a data modification to a component or process of the application in response to the modification request.

3. The system of claim 2, wherein the at least one processor is further configured to confirm the data modification to the component or process of the application via the application interface.

4. The system of claim 1, wherein generating a response to the additional user request further comprises providing one or more application system process details within the application interface without the use of a separate application.

5. The system of claim 1, wherein the application interface comprises a virtual assistant chat window interface.

6. The system of claim 1, wherein the user configuration further comprises one or more authentication credentials used to verify the identity of the user such as a username and password combination.

7. The system of claim 1, wherein generating a response to the additional user request further comprises listing one or more session data items below a virtual assistant chat window interface within the application interface.

8. A computer program product for dynamic debugging of data in a triage environment, the computer program product comprising a non-transitory computer-readable medium comprising code causing an apparatus to:
    receive a user request via an application on a user device;
    analyze the user request to determine a user configuration associated with a user;
    based on the user configuration, determine that the user is an application developer;
    automatically enable an option to toggle a debug mode on or off via an application user interface of the application;
    receive a user selection via the application user interface to toggle the debug mode on;
    receive an additional user request via the application interface; and
    generate a response to the additional user request, wherein the response includes one or more additional developer debug details, further comprising:
        dynamically generating a visual representation of system processes in real-time within the application user interface when the debug mode is enabled; and receiving a modification request via the application interface and updating a property value used in the application in response to the modification request.

9. The computer program product of claim 8, wherein the apparatus is further configured to:
   receive a modification request via the application interface; and
   initiate a data modification to a component or process of the application in response to the modification request.

10. The computer program product of claim 9, wherein the at least one processor is further configured to confirm the data modification to the component or process of the application via the application interface.

11. The computer program product of claim 8, wherein generating a response to the additional user request further comprises providing one or more application system process details within the application interface without the use of a separate application.

12. The computer program product of claim 8, wherein the application interface comprises a virtual assistant chat window interface.

13. The computer program product of claim 8, wherein the user configuration further comprises one or more authentication credentials used to verify the identity of the user such as a username and password combination.

14. The computer program product of claim 8, wherein generating a response to the additional user request further comprises listing one or more session data items below a virtual assistant chat window interface within the application interface.

15. A method for dynamic debugging of data in a triage environment, the method comprising:
   receiving a user request via an application on a user device;
   analyzing the user request to determine a user configuration associated with a user;
   based on the user configuration, determining that the user is an application developer;
   automatically enabling an option to toggle a debug mode on or off via an application user interface of the application;
   receiving a user selection via the application user interface to toggle the debug mode on;
   receiving an additional user request via the application interface; and
   generating a response to the additional user request, wherein the response includes one or more additional developer debug details, further comprising:
      dynamically generating a visual representation of system processes in real-time within the application user interface when the debug mode is enabled; and
      receiving a modification request via the application interface and updating a property value used in the application in response to the modification request.

16. The method of claim 15, wherein the method further comprises:
   receiving a modification request via the application interface; and
   initiating a data modification to a component or process of the application in response to the modification request.

17. The method of claim 16, wherein the at least one processor is further configured to confirm the data modification to the component or process of the application via the application interface.

18. The method of claim 15, wherein generating a response to the additional user request further comprises providing one or more application system process details within the application interface without the use of a separate application.

19. The method of claim 15, wherein the application interface comprises a virtual assistant chat window interface.

20. The method of claim 15, wherein the user configuration further comprises one or more authentication credentials used to verify the identity of the user such as a username and password combination.

* * * * *